United States Patent
O'Dwyer

(12) 
(10) Patent No.: US 6,701,818 B1
(45) Date of Patent: Mar. 9, 2004

(54) METHOD FOR SEISMIC EXPLORATION OF A REMOTE SITE

(75) Inventor: James Michael O'Dwyer, Sinnamon Park (AU)

(73) Assignee: Metal Storm Limited, Brisbane (AU)

( * ) Notice: Subject to any disclaimer, the term of this patent is extended or adjusted under 35 U.S.C. 154(b) by 0 days.

(21) Appl. No.: 09/958,466

(22) PCT Filed: Apr. 7, 2000

(86) PCT No.: PCT/AU00/00296

§ 371 (c)(1), (2), (4) Date: Feb. 26, 2002

(87) PCT Pub. No.: WO00/62004

PCT Pub. Date: Oct. 19, 2000

(30) Foreign Application Priority Data

Apr. 7, 1999 (AU) .............................. PP 9612

(51) Int. Cl.[7] ................................. F41F 1/08
(52) U.S. Cl. ..................... 89/1.41; 89/127; 181/116
(58) Field of Search .................. 89/126, 127, 1.41; 181/116, 117, 118; 175/4.55

(56) References Cited

U.S. PATENT DOCUMENTS

| | | | | |
|---|---|---|---|---|
| 4,222,306 | A | * | 9/1980 | Maury |
| 4,867,266 | A | * | 9/1989 | Martin ..................... 181/106 |
| 4,895,218 | A | * | 1/1990 | Chen et al. ............... 181/116 |
| 5,022,485 | A | * | 6/1991 | Mitchell .................. 181/106 |
| 5,381,721 | A | * | 1/1995 | Holmstrom et al. ....... 89/1.41 |
| 5,661,254 | A | * | 8/1997 | Steuer et al. ............ 89/1.815 |
| 5,883,329 | A | | 3/1999 | O'Dwyer |
| 6,123,007 | A | | 9/2000 | O'Dwyer |
| 6,138,395 | A | | 10/2000 | O'Dwyer |
| 6,223,642 | B1 | | 5/2001 | O'Dwyer |
| 6,301,819 | B1 | | 10/2001 | O'Dwyer |

FOREIGN PATENT DOCUMENTS

| | | |
|---|---|---|
| AU | A-63753/80 | 10/1980 |
| DE | 39 04 293 A1 * | 8/1990 |
| DE | 29708251 | 7/1997 |
| EP | 0320554 | 6/1989 |
| EP | 0 412209 A1 | 2/1991 |
| FR | 1 473621 A | 3/1967 |
| FR | 262 4962 | 6/1989 |
| GB | 1385277 | 2/1975 |
| JP | 8-280834 * | 10/1996 |
| JP | 09051957 | 2/1997 |
| SU | 1132270 A * | 12/1984 |
| WO | WO 94/20809 | 9/1994 |
| WO | WO 97/04281 | 2/1997 |
| WO | WO 98/55824 | 12/1998 |

OTHER PUBLICATIONS

PCT International Search Report—PCT/AU00/00296, Apr. 7, 2000, in the name of Metal Storm Limited, etc.
English Abstract of JP 08280834–A, published May 12, 1995, in Japan.
English Abstract of SU 1132270–A, published Dec. 30, 1984, in the Soviet Union.

* cited by examiner

Primary Examiner—Stephen M. Johnson
(74) Attorney, Agent, or Firm—Finnegan, Henderson, Farabow, Garrett & Dunner, LLP

(57) ABSTRACT

Barrel assemblies (1) each include a plurality of projectiles (11) arranged in-line within barrel (12) and associated with discrete selectively ignitable propellant charges (13) for propelling projectiles (11) through the muzzle of barrel (12). Projectiles (11) are arranged with one another and barrel (12) so as to prevent rearward travel of an ignited propellant charge to the trailing propellant charge. The matter or objects contained within holding body (17) may include explosive charges for scismic exploration, fire retardants, fire extinguishing means, pyrotechnics, herbicide, insecticide, fertilizer or seeds. Methods of delivering loaded projectiles (11) for civilian purposes are claimed.

18 Claims, 4 Drawing Sheets

METHOD FOR SEISMIC EXPLORATION OF A REMOTE SITE

TECHNICAL FIELD

This invention relates to methods of and apparatus for delivering loaded projectiles for civilian purposes.

The civilian purposes which may be embraced by this invention include, but are not limited to:

seismic exploration utilising explosive signal generators in the form of projectiles launched from a site remote from the location to be explored;

target specific fire fighting utilising projectiles containing fire retardant;

launching projectiles containing matter or objects to be delivered rapidly to a site remote from the launch site, such as difficult to access sites for subsequent retrieval from a containment part of the projectile, and launching projectiles containing matter to be dispersed from the a projectile in flight above a target zone, such as dispersal of fire retardants or insecticides or other treatment.

This invention has particular application to launching projectiles from a barrel having a plurality of projectiles arranged in-line within the barrel and which are associated with discrete selectively ignitable propellant charges for propelling the projectiles sequentially through the muzzle of the barrel. Sealing engagement is provided between projectiles and barrel so as to prevent rearward travel of an ignited propellant charge to the trailing propellant charge. Such barrel assemblies will be referred to hereinafter as of the type described. Such barrel assemblies are illustrated in our earlier International Patent Applications.

BACKGROUND ART

Seismic exploration of the earth's strata is extensively used in oil prospecting, as well as for site investigation in building large scale structures and other civil engineering projects such as for determination of depth to bedrock, delineation of sand and gravel deposits and detection of water-bearing fracture zones and the like in land and marine operations.

The principles of seismic methods of geophysical exploration or mapping are well known. Initially explosive charges were placed to initiate shock waves in the earth's crust. In order to provide appropriate signals a plurality of spaced apart subterranean charges were utilised. While this method is effective the cost of drilling and placement of the charges, mostly in remote areas, is extremely high. On-surface charges have also been trialled, however this did not result in the formation of an effective signal.

In more recent times most seismic exploration has been carried out using a VIBROSEIS type method in which vehicle mounted mechanical vibration apparatus is utilised to instigate the necessary subterranean shock waves. The mechanical vibrating source introduces a definite band of frequencies into the earth. Because of the physical constraints placed on a large vibrating body it is understood that the disturbance produced is in the form of an oscillatory pulse of finite duration in which the frequency changes, substantially linearly with time.

Such systems may have means to vary the frequency of vibration and amplitude of the pulse but such variations are also limited by the mechanical constraints of the particular equipment utilised. The duration of a typical seismic pulse will generally not exceed a few seconds with frequencies within a frequency range between 15 Hz and 90 Hz and with increasing amplitude of the pulse during the event.

Use of these methods is limited to vehicle accessible areas. However seismic signals are provided which enable a more detailed interpretation of the earth's strata to be achieved than is achieved using explosive detonation to generate the seismic signal. However this method is difficult to employ in remote areas and its cost of utilisation in such remote areas is high. There are also significant constraints on the signal type which may be generated, especially utilising mechanical vibration apparatus which of necessity must be by extremely large machines.

In marine operations, the most widely used method of generating seismic signals is to use an air-gun which discharges highly compressed air into the water.

Target specific fire fighting, such as remote fighting a fire in an office of a high rise building has typically been performed by directing a water stream or fire retardant from an elevated platform supported by an extendable ladder. This has limitations imposed by the time required to target the fire and the ability to closely position a nozzle to direct and supply the water or retardant to the site of the fire.

Limitations in delivery of other matter to remote sites is well understood.

OBJECTS OF THIS INVENTION

This invention aims to alleviate at least one or more of the difficulties associated with presently available delivery or placement methods.

DISCLOSURE OF INVENTION

With the foregoing in view, this invention in one aspect resides broadly in a method of seismic exploration including:

barrel assembly of the type described which is capable of firing a plurality of seismic signal instigating projectiles;

providing control means for controlling the rate of fire of the projectiles, and firing seismic signal instigating projectiles from said barrel assembly to the ground/water at a selected rate and/or direction to propagate the desired seismic signal.

The projectiles may be non-explosive projectiles which rely on impact for instigation of the desired seismic signal or the projectiles may contain explosives which detonate on impact with the ground or when dispose or beneath the ground/water.

Suitably the seismic signal is created by firing a series of projectiles into the ground or water. The barrel assembly may include a stack of barrel assemblies and the series of projectile firings to form the seismic signal may be formed by simultaneously firing the outermost ones of the projectiles in the stack of barrel assemblies.

The plurality of projectiles may be fired to enter the ground simultaneously or at selected intervals. The intervals may be achieved by controlling the firing rate, by axially staggering the projectiles to be fired and then firing them simultaneously either from a single barrel or from respective barrels or by controlling the trajectory of firing and the speed of craft/vehicle upon which the barrel assembly is mounted. If desired the trajectory of firing may be arranged to compensate for the speed of travel of the craft/vehicle, such as for vertical entry of the earth.

Using a pod of ninety-eight 40 mm barrels as described above and launching grenade-like explosives, the barrel assembly would have the ability to produce discrete seismic signals instigated by the firing of ninety-eight projectiles, or more or less, simultaneously or in a short burst or a smaller number of longer or more powerful signals each achieved by multiple simultaneous explosions from a selected number of simultaneous firings.

During a firing sweep, the amplitude of the desired seismic signal may then be varied as desired by firing the appropriate strength projectile, and of course the amplitude may also be varied by firing projectiles from a varying numbers of barrels simultaneously. Combinations of amplitudes and frequencies may therefore be generated that are difficult or impossible to achieve with conventional hydraulic or electromagnetic vibration plates utilised in a VIBROSEIS type method.

The pod may be fired from a marine platform into water, or from a sled towed underwater and if desired adapted to closely follow the contour of the underwater bed. It could be fired from a vehicle platform into the ground. The pod may also be fired from an aircraft, or from a number of aircraft flying in formation, with the firing coordinated between the aircraft by a suitable electronic link.

Such a method will provide for rapid exploration of large areas, particularly when the detection and recording of the seismic waves is achieved by suitable airborne laser or infra red means. Over water a similar capability may be introduced by the use of trailing hydrophones.

The above embodiments should enable sweep rates, amplitudes, and frequencies to be optimally selected to suit the geologic conditions in the area. This will enable seismic signals to be propagated which have a greater range of frequencies and amplitudes in a given sweep than conventional vibration methods.

This of the present invention should enable exploration of otherwise remote, inaccessible or difficult terrain and should provide a cost effective means of exploration.

According to a further aspect this invention resides in a method of target specific fire fighting, including:
    providing a barrel assembly of the type described which is capable of firing a plurality of projectiles each having containment for fire retardants, dousing or extinguishing means;
    providing control means for aiming and controlling the rate of fire of projectiles and/or quantity of the projectiles fired, and
    firing the projectiles in a controlled manner from a remote location toward the fire so as to douse the fire.

Suitably the barrel assembly is one of a plurality of barrel assemblies supported on a vehicle. The vehicle may be provided with aiming means such as a laser sight which provides a visual indication of the aim. Alternatively in a city environment for example the vehicle may be equipped or have instant access to electronically stored topographical information of the built landscape and be equipped with electronic navigation means or the like such that, for example, a room on fire having an exterior window in a certain floor of a multistorey building may be targeted by parking the vehicle nearby, and suitably within line of sight of the target, and entering in the stored reference for that window.

The control means may permit a test firing of a non-active projectile preliminary to firing a desired volley of active projectiles for dousing the blaze. The control means may control the rate of fire and/or direction of selected or each barrel assembly. The vehicle may contain pods of barrels each loaded with projectiles adapted for treating specific fire types, such as an electrical fire or a chemical fire and the control means may permit firing only the appropriate barrels or sequence of loaded barrel types to achieve the desired result.

In yet a further aspect this invention resides broadly in a method of rapidly delivering matter or objects to a remote site, including:
    providing a barrel assembly of the type described which is capable of firing a plurality of projectiles each having a containment for matter or objects to be delivered to the remote site;
    loading the containments with the matter or objects to be delivered;
    providing control means for aiming and controlling the rate of fire of projectiles and/or quantity of the projectiles fired, and
    firing the projectiles in a controlled manner from the barrel assembly to the remote location.

Each containment may contain matter to be dispersed in-flight above the remote location, such as fire retardant or insecticide or other treatment. In such applications the containment may be opened explosively or the containment may contain chemical or mechanical extrusion means for forcing the matter through one or more rupturable openings formed in the wall of the containment.

Alternatively the containment may be adapted to be recovered intact to enable the contents to be recovered. For this purpose the containment may include a cover which is latched or screw connected to the main body of the projectile or otherwise adapted to be opened for recovery of the contents therefrom. Further the projectile may be adapted to deploy a parachute above the target zone for delivery of shock sensitive material from the containment.

The projectiles may be formed of biodegradable material to prevent long term accumulation of refuse at sites to which material is delivered by the method of this invention.

DESCRIPTION OF PREFERRED EMBODIMENTS

In order that this invention may be more readily understood and put into practical effect, reference will now be made to the accompanying drawings which illustrate typical embodiments of the invention, wherein.

Figure 1:
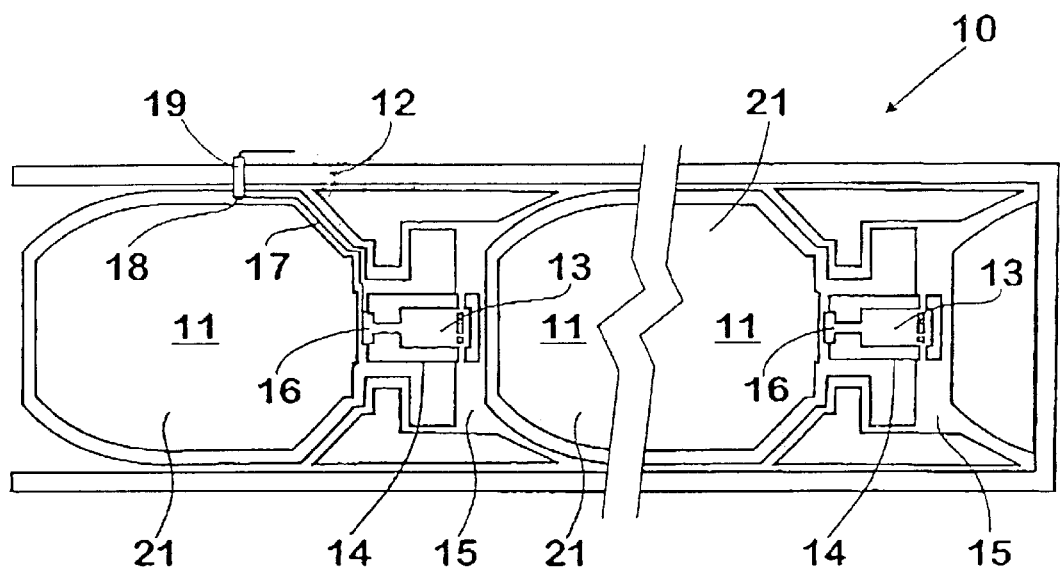
FIG. 1 is a diagrammatic cut-away view illustrating a typical barrel assembly for launching load carrying projectiles.

The barrel assembly 10 illustrated in FIG. 1 has multiple load carrying projectiles 11 loaded in a rifled barrel 12 to impart spin upon firing for activating the arming device. Arming of the projectiles for discharge of their load from the containment 21 or activating firing of the explosive material carried thereby can be selected by a spin count method or others means, separately or in combination for additional safety, and commonly used in 40 mm grenades, including a flight-timing device.

In the above embodiment the propellant 13 in each high pressure chamber 14 is adapted to be ignited by electronically controlled ignition to expel high pressure gases through the trailing ports into the low pressure chamber 15 by a detonator 16 triggered through an electrical circuit which uses the projectile column as one part of the circuit, the barrel 12 being made of insulating material or so lined and with the circuit completed by an imbeded insulated wire 17 leading from the detonator 16 to a contact 18 on the projectile surface which is aligned when loaded, with a complementary contact 19 supported in the barrel 12.

Alignment of the contacts can be achieved in a barrel and projectile located by rifling grooves during the loading process. In a non rifled design, the use of a annular contact in the barrel wall can achieve a similar result.

For the purposes of seismic exploration, a cluster of barrel assemblies 20 adapted to launch grenade like projectiles is contained in a pod 23 such that a selected number of near simultaneously exploding grenades, as illustrated at 22, may be fired to the site to be explored to create the seismic signal.

Suitably 40 mm grenades are used as the projectiles because of their ready availability. The grenades are fired selectively by computer control from the pod 23 which is envisaged will contain ninety-eight barrel assemblies each containing stacked grenades and having selectively ignitable internal or external propellant charges. The grenades may be selectively fired to form a controlled impact array of exploding grenades on the zone to be investigated.

By way of example, using such a barrel assembly in a pod of ninety-eight 40 mm barrels that would measure approximately 350 mm×700 mm in cross section, with each barrel loaded with six projectiles, and with each projectile similar in size to a conventional 40 mm military grenade, a barrel length of 900 mm would be required and the assembly would provide a projectile capacity of five hundred and eighty-eight projectiles.

This configuration would be suitable for seismic applications requiring a short range such as for delivering projectiles from downwardly facing barrels. For longer range delivery fewer projectiles would be accommodated in each of such barrels or longer barrels would be used and more propellant would be utilised to achieve higher muzzle exit velocities. Other configuration may be used to suit the particular requirements.

The maximum rate of fire per barrel is expected to be as high as 20,000 projectiles per minute. Therefore, the maximum rate for the combined ninety-eight barrels would be 1,960,000 projectiles per minute, assuming that all barrels are fired simultaneously at the maximum rate.

For a ninety-eight shot burst firing the leading round from each of the ninety-eight barrels, the rate is infinitely variable and which may be a ninety-eight shot burst fired at a rapid frequency.

The above ninety-eight barrel pod is one example of a range of performance specifications that could be available. Different performance specifications can be generated by altering the component parts of the pod. For example, a pod may be preloaded such that the nature and weight of the explosive projectile may vary between individual barrels in the pod.

Figure 2:
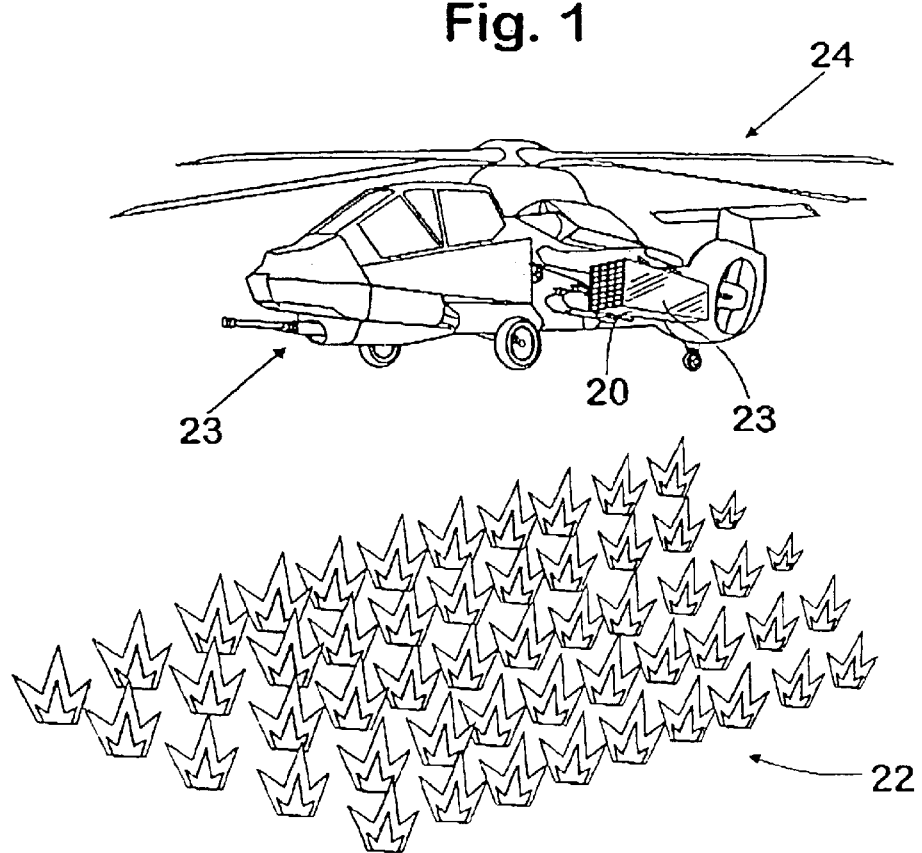
FIG. 2 illustrates a firing arrangement suitable for seismic exploration.

In the embodiment illustrated in FIG. 2, the grenades are fired downwardly from a pair of such pods 23, only one of which is shown, carried by a helicopter 24. Alternatively the grenades 22 could be fired from ground based pod to impact a safe distance away. The pod could be remotely operated for safety reasons if desired. Conventional recording means would be activated to record the resultant seismic signals for analysis of the strata by known methods.

Figure 3:
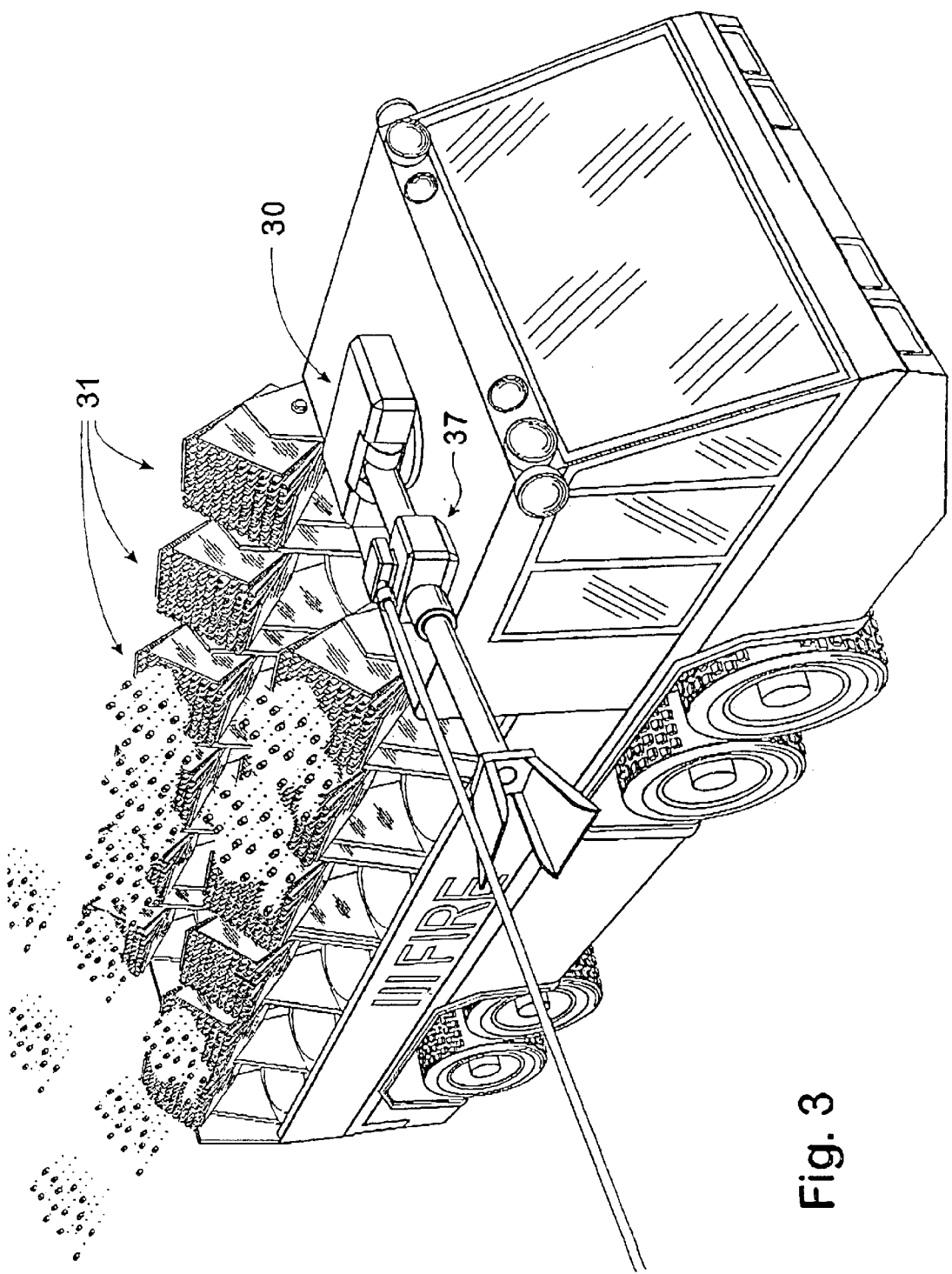
FIG. 3 illustrates a firefighting vehicle according to a further aspect of this invention.
Figure 5:
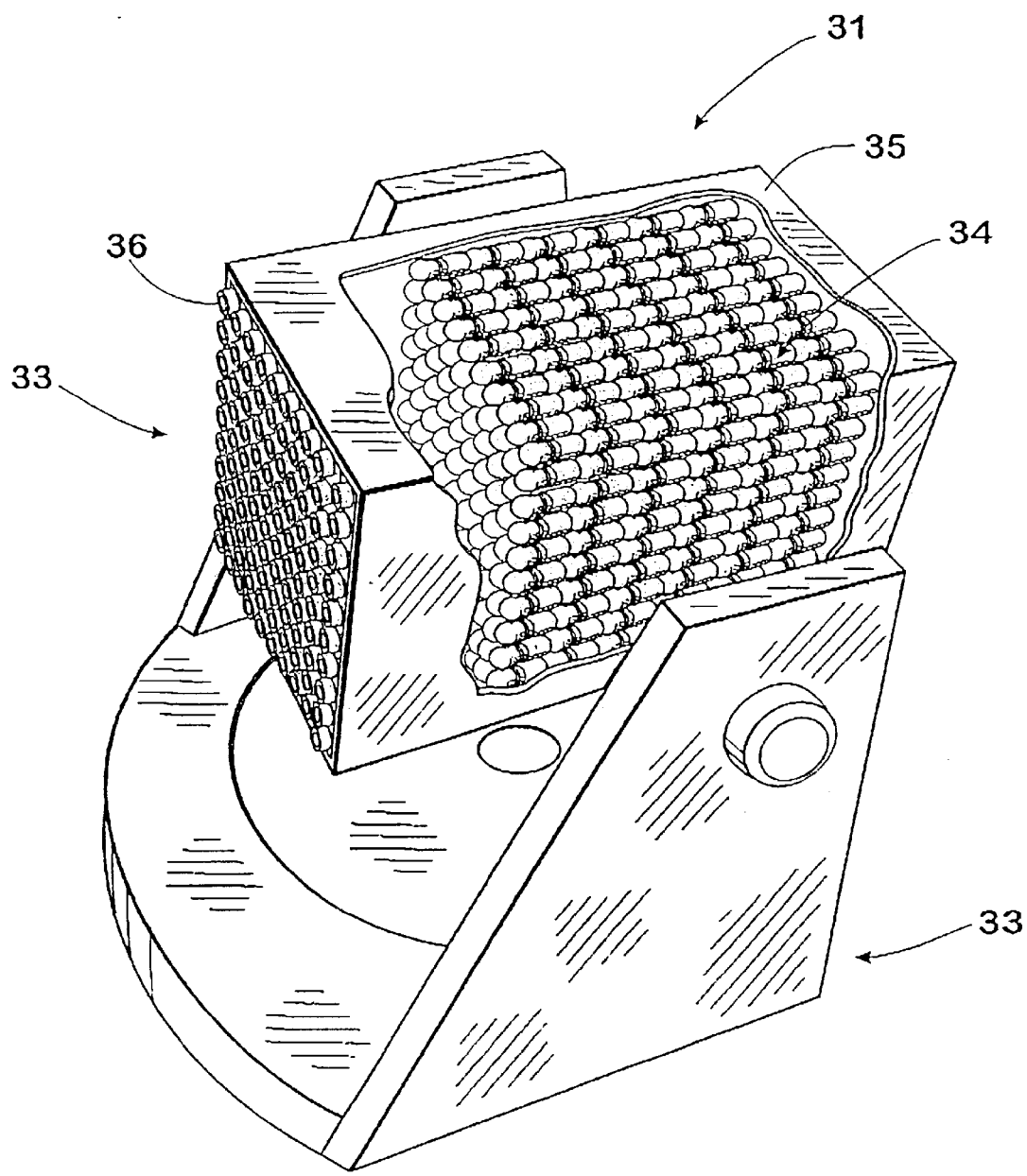
FIG. 5 is a diagrammatic view illustrating the arrangement of the projectiles in a single pod of barrel assemblies.

The fire fighting vehicle 30 illustrated in FIG. 3 has banks of pods 31 mounted on turret mountings 32 whereby each pod 31 may be selectively directed toward a desired target. As illustrated in FIG. 5 each pod 31 may contain 100 barrel assemblies 33 of the type described and such as is illustrated in FIG. 1 each loaded with six projectiles 34 having fire retardant in their containment portion 21.

The barrel assemblies 33 are suitably contained within an expandable housing 35 whereby their outer ends 36 may be opened to accommodate the barrel assemblies 33 when disposed in a splayed arrangement, as illustrated in FIG. 3. To achieve splaying a camming plate (not illustrated) may be arranged for movement along the outer end portions of the barrel assemblies 33 which have their lower ends pivotally located in the base wall of the housing 35.

Figure 4:
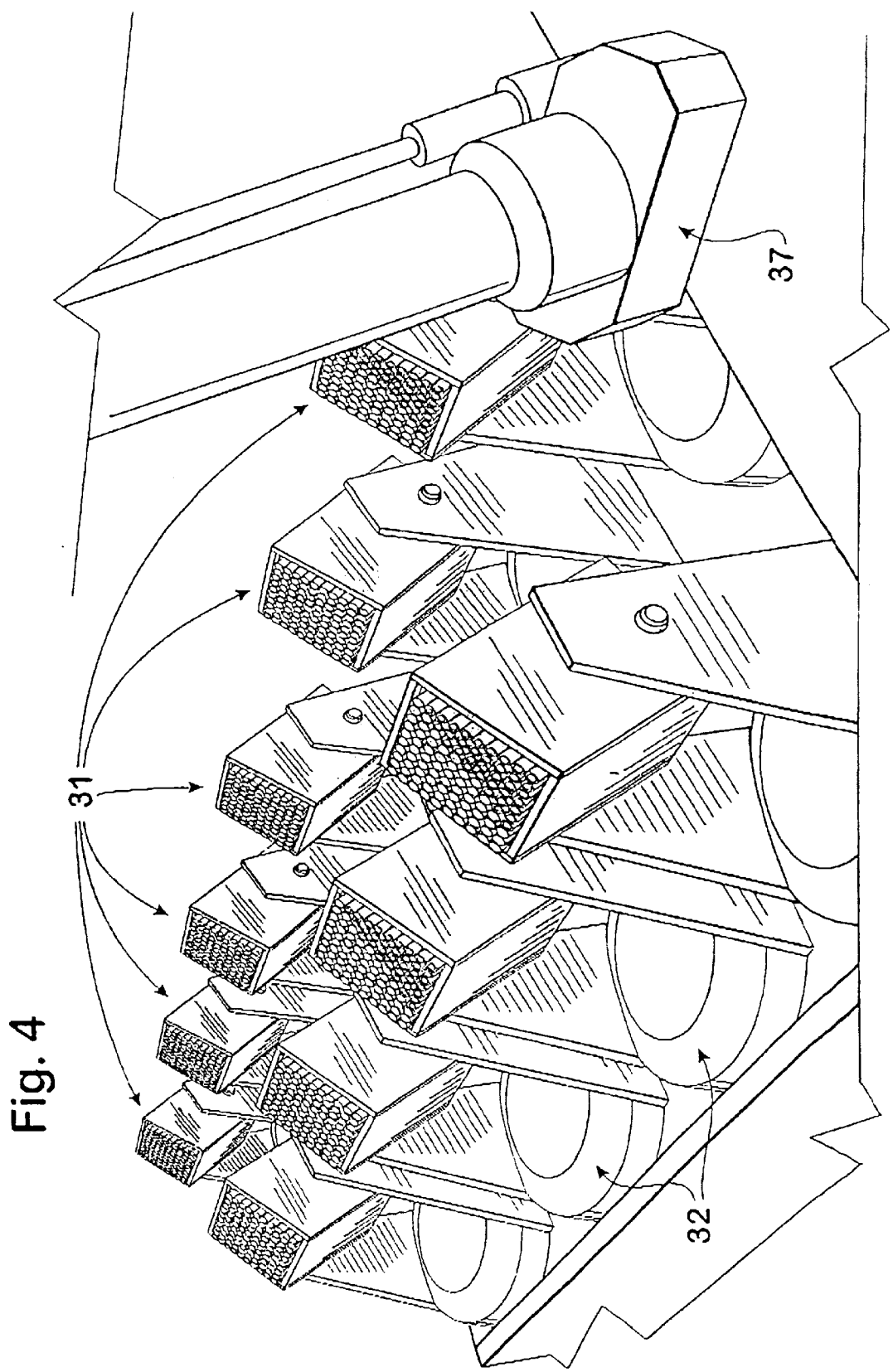
FIG. 4 is an enlarged view illustrating the barrel pods of FIG. 3 in their inoperative travel mode.

Firing the projectiles 34 from splayed barrel assemblies would result in a more general distribution of the projectiles over the target zone, such as may be required for extinguishing a fire in a crashed jet liner. On the other hand if the target is a window in a multistorey building the barrel assemblies 33 could be retained in a parallel relationship, as illustrated in FIG. 4, or in a slightly converging relationship and their projectiles 34 could be fired simultaneously in banks as desired for delivering the required treatment directly to the site of the fire.

In the illustrated embodiment up to 7,200 projectiles could be delivered from the vehicle 30 into a high rise building in as little as 0.02 seconds. As the pods can be aimed the vehicle need only be parked proximate the building for emergency delivery of its fire fighting projectiles into the building. The vehicle 30 incorporates a laser aiming system 37 for accurate aiming of the barrel assemblies.

The pods of barrel assemblies and their mountings as illustrated in FIGS. 1 to 5 could also be utilised in the other aspects of this invention, utilising the containment portion 21 of each projectile 11 for delivering explosive material for seismic exploration, fire retardant, pyrotechnics, herbicide, pesticide, fertiliser or seed for example.

It will of course be realised that the above has been given only by way of illustrative example of the invention and that all such modifications and variations thereto as would be apparent to persons skilled in the art are deemed to fall within the broad scope and ambit of the invention as is defined by the appended claims.

What is claimed is:

1. A method of seismic exploration of a remote land or marine site, said method including the steps of:

providing a barrel assembly comprising a barrel having a plurality of projectiles arranged in-line within the barrel in sealing engagement with the barrel and which projectiles are associated with discrete selectively ignitable propellant charges for propelling the projectiles sequentially through the muzzle of the barrel, wherein said sealing engagement prevents rearward travel of an ignited propellant charge to a trailing propellant charge, which barrel assembly is capable of firing a plurality of seismic signal instigating projectiles; and firing said plurality of seismic signal instigating projectiles from said barrel assembly to the ground or water at a selected rate and/or directions to propagate a desired seismic signal.

2. The method as claimed in claim 1, wherein said seismic signal instigating projectiles are explosive projectiles.

3. The method as claimed in either claim 1 or claim 2, wherein the seismic signal is created by firing a series of seismic signal instigating projectiles into the ground or water.

4. The method as claimed in claim 1, wherein the plurality of seismic signal instigating projectiles are fired to enter the ground or water simultaneously.

5. The method as claimed in claim 1, wherein the plurality of seismic signal instigating projectiles are fired to enter the ground or water at selected firing intervals.

6. The method as claimed in claim 5 wherein said selected firing intervals are achieved by controlling the rate of firing the seismic signal instigating projectiles from the barrel.

7. The method as claimed in claim 5 wherein the barrel assembly is mounted upon a vehicle and said selected firing intervals are achieved by controlling the speed of the vehicle.

8. The method as claimed in claim 2, wherein said explosive projectiles detonate upon impact with the ground.

9. The method as claimed in claim 2, wherein said explosive projectiles detonate when disposed beneath the ground or water.

10. The method of claim 1 including the step of controlling the rate of fire of the projectiles.

11. A method of seismic exploration of a remote land or marine site, said method including the steps of:

providing a cluster of barrel assemblies, each barrel assembly of the cluster comprising a barrel having a plurality of projectiles arranged in-line within the barrel in sealing engagement with the barrel and which projectiles are associated with discrete selectively ignitable propellant charges for propelling the projectiles sequentially through the muzzle of the barrel, wherein said sealing engagement prevents rearward travel of an ignited propellant charge to a trailing propellant charge, which barrel assemblies are each capable of firing a plurality of seismic signal instigating projectiles; and firing individual ones of said plurality of seismic signal instigating projectiles from selected ones of said barrel assemblies to the ground or water at a selected rate and/or directions to propagate a desired seismic signal.

12. The method as claimed in claim 11 wherein said barrel assemblies are mounted upon a vehicle and said desired seismic signals are achieved, at least in part, by controlling the speed of the vehicle.

13. The method as claimed in claim 11 wherein said barrel assemblies are mounted upon a vehicle and said desired seismic signals are achieved, at least in part, by controlling the firing direction of the cluster of barrel assemblies.

14. The method of claim 11 including the step of controlling the rate of fire of the projectiles.

15. The method as claimed in claim 11 Wherein the seismic signal is created by firing a series of seismic signal instigating projectiles from said plurality of seismic signal instigating projectiles into the ground or water.

16. The method as claimed in claim 15, wherein the cluster includes a stack of barrel assemblies and said series of seismic signal instigating projectiles are fired simultaneously from outermost ones of the projectiles in the stack of barrel assemblies.

17. The method as claimed in claim 15 wherein the amplitude of said seismic signal is varied by firing projectiles simultaneously from a varying number of barrels.

18. The method as claimed in claim 15 wherein said seismic signal instigating projectiles are explosive projectiles of different explosive strengths and the amplitude of said seismic signal is varied by selecting projectiles of corresponding strengths.

* * * * *